(12) United States Patent
Mehta

(10) Patent No.: US 9,461,972 B1
(45) Date of Patent: Oct. 4, 2016

(54) INTELLIGENTLY DESIGNED USER INTERFACE BASED ON USER BEHAVIOR

(71) Applicant: NetSuite Inc., San Mateo, CA (US)

(72) Inventor: Suhas Rohit Mehta, Santa Clara, CA (US)

(73) Assignee: NetSuite Inc., San Mateo, CA (US)

( * ) Notice: Subject to any disclaimer, the term of this patent is extended or adjusted under 35 U.S.C. 154(b) by 0 days.

(21) Appl. No.: 14/608,519

(22) Filed: Jan. 29, 2015

Related U.S. Application Data

(60) Provisional application No. 61/955,602, filed on Mar. 19, 2014.

(51) Int. Cl.
*H04L 9/32* (2006.01)
*H04L 29/06* (2006.01)

(52) U.S. Cl.
CPC .................. *H04L 63/0435* (2013.01)

(58) Field of Classification Search
CPC .................................................. G06Q 30/0621
USPC ............ 713/164, 153, 155, 170; 726/2, 5, 6; 380/201, 270, 281; 725/80, 91, 97
See application file for complete search history.

(56) References Cited

U.S. PATENT DOCUMENTS

| | | | | |
|---|---|---|---|---|
| 2007/0294494 | A1* | 12/2007 | Conti | G06F 12/123 711/158 |
| 2008/0281952 | A1* | 11/2008 | Fedotenko | H04W 8/183 709/223 |
| 2010/0104099 | A1* | 4/2010 | Kim | H04W 12/02 380/270 |
| 2011/0219273 | A1* | 9/2011 | Nagata | G06F 3/01 714/57 |
| 2013/0290858 | A1* | 10/2013 | Beveridge | G06F 17/30899 715/740 |
| 2014/0280478 | A1* | 9/2014 | Chiussi | H04L 67/36 709/203 |

OTHER PUBLICATIONS

"Ahsay Backup Software v7 How to hide encryption key in AhsayOBM / AhsayACB user interface"—Ahsay, Jun. 2012 https://www.ahsay.com/download/customer/document/ahsay_v7_hide-encryption-from-client.pdf.*

* cited by examiner

*Primary Examiner* — Randy Scott
(74) *Attorney, Agent, or Firm* — Lane Powell PC

(57) ABSTRACT

Systems, apparatuses, and methods for enabling the efficient configuration of a User Interface (UI) for a user so that the configured UI represents the UI elements used most commonly by the user. In one embodiment, the invention may be used by the operator and users of a multi-tenant business data processing platform to permit each user to be associated with a specific configuration of UI elements and capabilities based on that user's typical or most common usage patterns. Further, in one embodiment, information or data that represents the UI configuration associated with a user may be encoded and provided to the multi-tenant business data processing platform in an efficient manner to enable the platform to present the desired UI to that user.

21 Claims, 7 Drawing Sheets

INTELLIGENTLY DESIGNED USER INTERFACE BASED ON USER BEHAVIOR

CROSS REFERENCE TO RELATED APPLICATION

This application claims the benefit of U.S. Provisional Application No. 61/955,602, entitled "Intelligently Designed User Interface Based on User Behavior," filed Mar. 19, 2014, which is incorporated by reference herein in its entirety (including Appendix) for all purposes.

BACKGROUND

User interfaces ("UIs") are an important element of many software applications, machines, devices, and processes. A UI (sometimes termed a man-machine interface) permits a user to access and control the capabilities of an application, machine, device, or process by providing a mechanism for the user to interact with the elements or components of the application, machine, device, or process. A UI may permit a user to set certain operating parameters, provide input data, select certain desired functions for execution, specify a data field for data input or specify an output format for data, and otherwise configure the operation of the application, machine, device, or process.

Typically a User Interface will have a set of adjustable or configurable features, such as a list of selectable entries in a drop-down menu, selectable functions, selectable data formats, selectable tabs, or other available features. And, also typically, a user will over time prefer certain UI elements or settings, and tend to utilize a UI that is configured a specific way or ways for most of their uses of the related application, machine, device, or process. For example, a user may typically enter or request certain data types, where those types represent a sub-set of the available data types. Similarly, a user may regularly utilize only a sub-set of the data fields or selectable features that are part of a user interface (e.g., a user may only regularly use a sub-set of the displayable folders, options, etc.).

Different users of a system which is used by multiple users may have their own preferred set of UI features that they use regularly. It is possible for a multi-user system or platform to have hundreds or thousands of desired UI configurations, with each such configuration associated with a different user of the system. This can create inefficiencies because re-configuring or personalizing a UI may take time for a user to do, and typically, a user may not be aware of which UI elements they customarily use or the frequency with which they use certain elements. Further, the converse option of leaving a complex UI in a general state may confuse a user or cause them to waste time navigating through the options that are part of the UI.

Conventional approaches to configuring a UI in a personalized (i.e., user customized or dependent) manner are inefficient and suffer from limitations that make such approaches impractical for some operating environments. For example, most methods of providing a customized UI are restricted to use on a specific machine and/or are limited in the variety of configurations that may be associated with a specific user. Embodiments of the invention are directed toward solving these and other problems individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the invention are directed to systems, apparatuses, and methods for enabling the efficient configuration of a User Interface (UI) for a user so that the configured UI represents the UI elements used most commonly by the user. In one embodiment, the invention may be used by the operator and users of a multi-tenant business data processing platform to permit each user to be associated with a specific configuration of UI elements and capabilities based on that user's typical or most common usage patterns. Further, in one embodiment, information or data that represents the UI configuration associated with a user may be encoded and provided to the multi-tenant business data processing platform in an efficient manner to enable the platform to present the desired UI to that user.

In one embodiment, each configurable element of a user interface is associated with an index or identifying character. For example, a form may have a set of data input fields, with each field associated with a unique number, character, or other form of identifier. Each time a user enters data into the form, a process captures the fields into which data was entered (which may be, and typically are, a sub-set of the available fields). This data can be evaluated to determine which fields of that form are most typically used by that user, based on a specified set of criteria (such as number of uses, variance in fields used, most commonly used fields, frequency of use, etc.). The usage data may then be stored with an identifier of the relevant form and the user.

In another embodiment, the elements of a drop down menu, the menus provided, the UI elements able to be configured or selected, etc. may each be associated with a unique identifier. Based on observation or tracking of a user's behavior, the UI aspects or elements used or those used most frequently (or those satisfying another criterion, such as those elements deemed by a manager to be needed and available for a project) may be converted to data which is stored with an identifier of the relevant UI display or application and the user. In one embodiment, when presented to a user, the user interface aspects or elements that are used by that specific user may be sorted or displayed in a drop-down list based on their relative frequency of use.

In one embodiment, the user interface element usage data may be encoded as a binary number, with each of the individual numerals having a value of one or zero and representing the use (indicated by a "1") or non-use (indicated by a "0") of an associated field or UI element (thus each field or UI element is associated with a unique position in a string of ones or zeros). In one embodiment, the binary number may be converted to its decimal (or hexadecimal) equivalent and stored in association with the form (or UI display or application) identifier and user identifier. The decimal (or hexadecimal) equivalent and associated form (or UI display or application) identifier and user identifier may then be transferred to a system when the user logs on or accesses some aspect of the system. The system can then interpret the transferred data (by "decoding" the decimal (or hexadecimal) representation into a corresponding binary one and associating the digits in the binary representation with use or non-use of a specific UI element) and configure the form or other UI element(s) based on the transferred data. As noted, when displaying the user's UI aspects or elements, some may be presented to the user in the form of a drop-down list or menu, with the items in the list ordered according to relative frequency of use by that user or the relative order of predicted or expected use based on other available information about the user, the application, the user's most recent tasks, etc.

In one embodiment, the binary number which represents an encoding of the UI element use data may be converted to another suitable format, such as a decimal (or hexadecimal) number—a form of security key (for implementing a data payload encryption/decryption process). Such a key could be used to provide added security to the application users, and may be used for a form of encryption and decryption of the data (payload) transmitted. In one embodiment, such an encryption/decryption process may be changed for each use that generates a new "security key", where that key is available or discoverable at the client as well as server. In this way, due to the changing nature of the encoding/decoding of UI elements usage binary data, security will be enhanced as the method will be more difficult to predict or anticipate. Note that the key may be used for the purposes of encrypting and decrypting not only the data representing the UI elements, but also the new encoded representation of those UI elements usage (such as the binary/decimal/hexadecimal number) to increase the security of the data transfer. The key could be transferred between the user's terminal and a server by a suitable means (such as being contained in a separate message) or determined by each element in accordance with a pre-determined list or method.

In one embodiment, the invention is directed to a method of configuring a user interface for a user, where the method includes:
  determining the user's usage data for one or more elements of the user interface;
  processing the usage data to determine a set of user interface elements to present to the user at a later time;
  converting the determined set of user interface elements to present to the user at a later time into a current representation;
  based on the current representation, generating a current key value;
  storing data representing the current key value in a data storage element accessible by the user's client device;
  providing data representing the current representation, the current key value, the user, and the user interface to a remote data processing element;
  at a later time, sending a request to access the user interface for the user to the remote data processing element;
  receiving the request from the user to access the user interface at the remote data processing element;
  operating the remote data processing element to access the current representation and the current key value associated with the user;
  encrypting the current representation using a process dependent on the current key value;
  providing data representing the encrypted current representation, the user, and the user interface to the client device;
  receiving the data representing the encrypted current representation at the client device;
  operating the client device to access the stored data representing the current key value;
  decrypting the data representing the encrypted current representation using the current key value; and
  presenting the user interface to the user based on the decrypted data.

In another embodiment, the invention is directed to an apparatus for configuring a user interface for a user, where the apparatus includes:
  a processor programmed to execute a set of instructions;
  a data storage element in which the set of instructions are stored, wherein when executed by the processor the set of instructions cause the apparatus to
    determine the user's usage data for one or more elements of the user interface;
    process the usage data to determine a set of user interface elements to present to the user at a later time;
    convert the determined set of user interface elements to present to the user at a later time into a current representation;
    based on the current representation, generate a current key value;
    store data representing the current key value in a data storage element accessible by the user's client device; and
    provide data representing the current representation, the current key value, the user, and the user interface to a remote data processing element.

In another embodiment, the invention is directed to a multi-tenant data processing system, where the system includes:
  one or more business related data processing applications installed in the system and accessible by a plurality of tenants of the multi-tenant data processing system;
  a data storage element accessible by a plurality of tenants of the multi-tenant data processing system;
  a processor programmed with a set of instructions, wherein when executed by the processor the instructions cause the system to
    receive a request from a user to access a user interface;
    in response to the user request, access a current representation of user interface data associated with the user and a current key value associated with the user;
    encrypt the current representation of user interface data associated with the user using a process dependent on the current key value; and
    provide data representing the encrypted current representation, the user, and the user interface to a client device associated with the user.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which.

Note that the same numbers are used throughout the disclosure and figures to reference like components and features.

DETAILED DESCRIPTION

Figure 1:
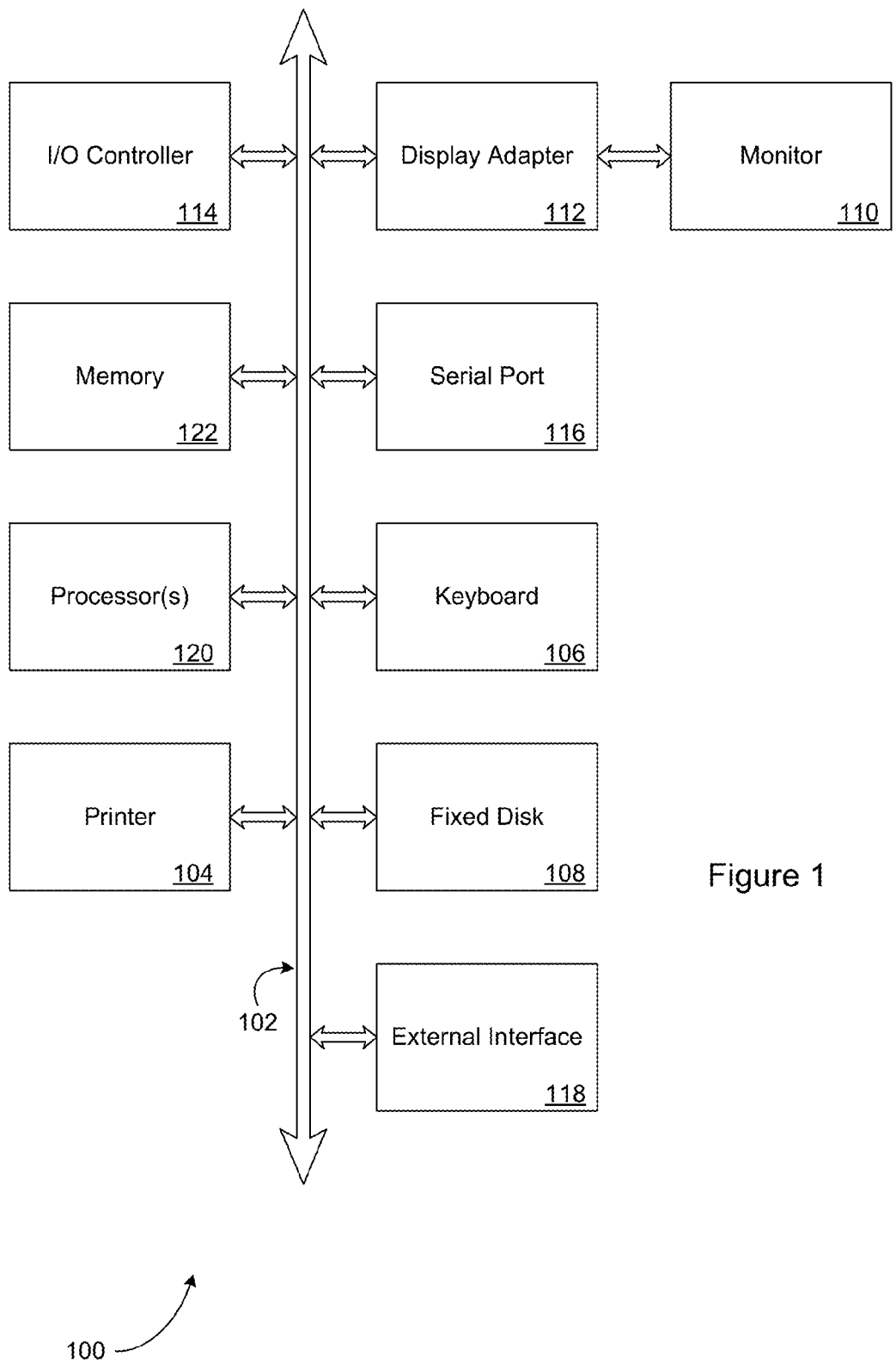
FIG. 1 is a diagram illustrating elements or components that may be present in a computer device or system configured to implement a method, process, function, or operation in accordance with an embodiment of the invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that are part of a client device, server, network element, or other form of computing or data processing device/platform and that are programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

Embodiments of the present invention are directed to systems, apparatuses, and methods for enabling the efficient configuration of a User Interface (UI) for a user so that the configured UI represents the UI elements used most commonly (or expected or predicted (and possibly required) to be used most commonly) by the user. In one embodiment, the invention may be used by the operator and users of a multi-tenant business data processing platform to permit each user to be associated with a specific configuration of UI elements and capabilities based on that user's typical, expected, predicted, or most common usage patterns. Further, in one embodiment, information or data that represents the UI configuration associated with a user may be encoded and provided to the multi-tenant business data processing platform in an efficient and secure manner to enable the platform to present the desired UI to that user. Note that the user may be operating a client device such as a desktop computer, laptop computer, tablet computer or mobile phone, or may be operating a terminal that is part of a networked system, where the user is in communication with the business data processing platform. Note also that the user interface may consist of or include text elements, graphic elements, visual components, links, tabs, menus, etc.

For example, in one embodiment, each configurable element of a user interface may be associated with an index or identifying character (e.g., an alphanumeric character, color, etc.). For example, a form may have a set of data input fields, with each field associated with a unique number or character that provides an identifier for that field. Each time a user enters data into the form, a process captures the fields into which data was entered (which may be, and typically is, a sub-set of the available fields). This data capturing process may be executing on a client device (e.g., as part of a browser or resident application) or on a server/platform. For example, a counter may be incremented each time the form is used, with a separate counter (or counters) incremented each time data is found modified in a particular field or region. This data can be evaluated to determine which fields of that form are most typically used by that user, based on a defined set of criterion (such as the number of times each field is used to enter/modify data, the variance in the fields used, a ranking of the most commonly used fields, the relative frequency of a field being used, etc.). The usage data may then be stored with an identifier of the relevant form and of the user.

In one embodiment, this usage data capture can be implemented using a client side JavaScript that gathers the data about each field on the form that is used each time the form is submitted to the server for actual data persistence. This data can be stored (separately from the actual form data) on the server but associated with the end-user profile and preferences. These preferences are then loaded when the end-user requests the server to load one of the forms. The usage data may be stored in any suitable format, including but not limited to one or more of the following:

A comma separated list of Form Field IDs only;

As a Name: Value pair—where Name is the form field ID and value is the frequency of use of this field;

As a Name: ## pair—where Name is the form field ID and ## is 1 if the field is used in the current use of the form and −1 if the field is not used in the current form;

The usage data may be stored as an integer number. For e.g., in a form with 8 fields and fields 1, 3, 4 & 7 being modified the most by the user, the actual usage data would be "10110010", and the inventive system could store '178' (as an equivalent decimal representation) or 'B2' (as an equivalent hexadecimal representation). Field-use frequency may be calculated when the form is submitted based on the User-Form history; or The usage data may be stored as an integer number. For example, in a form with 8 fields and fields 1, 3, 4 & 7 being modified the most by the user, the actual usage data would be "10110010", and the inventive system could store '178' (as an equivalent decimal representation) or 'B2' (as an equivalent hexadecimal representation). Field-use frequency may be calculated (based on the User-Form history and the new usage data from the current submission) in a default User-Form record when the form is submitted. In this case, the default User-Form frequency value will be provided when the form is requested by the user the next time.

After submission of a certain number of forms (or another factor, such as a number of actions performed by the user, a number of data access operations requested, a number of application access operations requested, etc.), the process may generate one or more of a ranking of the frequency of the user's use of each field, an output of a decision process indicating a sub-set that are most likely to be used, an output of a machine learning model that represents a "prediction" of what fields are likely to be used (e.g., based on one or more of the user's identity, the day or date, the tasks being performed by the user, the applications being accessed by the user, or any other relevant data or information), an indicator of any field that was used at least once, an indicator of a field that was never used, etc. Note that the element frequency of use value or number of times an element is used data may be modified as desired (e.g., boosted, increased or decreased for certain elements or combinations of elements) to take into account one or more user interface elements that are required to be available to a user, required to be used, specified by a manager as being desirable to be available, etc.

In one embodiment, the usage data and/or an output of the decision or prediction process may be encoded or represented as a binary number, with each of the individual numerals having a value of one or zero and representing the use (indicated by a "1") or non-use (indicated by a "0") of an associated field (thus each field or UI element is associated with a unique position in a string of ones or zeros, with the value of one or zero indicating that the UI element, form field, menu item, etc. is either to be presented to the user or not presented to the user). As noted, the usage data/binary number may be subject to further processing, filtering, etc. to emphasize or deemphasize certain characteristics. For example, based on a set of business rules or task descriptions, certain form fields may always be provided to the user (i.e., represented by a value of "1"), while other fields may be hidden or require the user to perform some action in order to be able to access them (i.e., represented by a "0", but be subject to access after a user fulfills certain requirements, such as a threshold number or percent of uses).

In one embodiment, the binary number may be converted to its decimal (or hexadecimal) equivalent—a form of security key—and stored in association with the form identifier and a user identifier. The decimal (or hexadecimal) equivalent and associated form identifier and user identifier may then be accessed by or transferred to a system when the user logs on or accesses some aspect of the system. The system can then interpret the transferred data and configure the form or other UI element(s) based on the transferred data. This may entail conversion of the decimal (or hexadecimal) number to its binary equivalent, followed by mapping the binary numerals to an index to the fields of the form. This provides information that may be used to determine which fields on that particular form to present to a particular user. As noted, this encoding may be used to provide a form of encryption (such as by encrypting the payload by either circular left or right shifting the binary bits by n number of places, where n is determined by the lowest decimal digit of the shared security key).

As noted, in one embodiment, the binary number which represents an encoding of the UI element use data may be converted to another suitable format, such as a hexadecimal number (e.g., to function as a security key). Such a format may be used to provide added security for the application users, and may be used as a key to encrypt and decrypt the data transmitted. In one embodiment, such an encoding/decoding may be changed for each use, with a new "key" that generates a different encryption process or method being made available (or discoverable) at the client as well as server. In this way, due to the changing nature of the encoding/decoding key, data security will be enhanced as the method used will be more difficult to predict. Similarly, a shared key could be used for purposes of encrypting and decrypting the data representing the UI elements or the encoded representation of those elements (such as the binary number) to increase the security of any data transfer. The key could be transferred between the user's terminal and a server by a suitable means (such as being contained in a separate message) or determined by each element in accordance with a pre-determined list or method.

Although the following example will be described with reference to configuration of the data entry fields of a form and the use of an embodiment of the invention to configure that form as part of providing a user interface to a user of a multi-tenant business data processing platform, note that embodiments of the invention are not limited to such user interfaces and/or operating environments. For example, the concepts underlying the invention may be used to identify one or more of the user interface elements, menus, folders, sub-folders, format, display schemes, selectable features, system settings, etc. that are used by a specific user, and to store data relating to those user interface aspects. The data may then be processed (e.g., by a form of thresholding, statistical evaluation or machine learning model) and subjected to one or more decision rules, business rules, etc., to determine which of those user interface elements to provide to that user in the future. One or more of the determined set of user interface elements may then be filtered, modified, emphasized, de-emphasized, or subject to another process before being encoded or otherwise represented by a string of numbers, such as binary numbers. The resulting binary numeral (consisting of a string of ones and zeros) may then be converted to a decimal number or to another representation having a one-to-one correspondence to the binary numeral. The decimal or other representation may then be transferred with an identifier of the user interface (or user interface template) and an identifier of the user to a device, software application, operating system, computer, network element, apparatus, or other component having a configurable user interface. In some embodiments, this device, software application, operating system, computer, network element, apparatus, or other component may have multiple users (such as the described multi-tenant platform or a networked server connected to multiple client terminals), with each user then being able to be provided with a personalized/customized user interface.

As noted, in some embodiments, the invention may be implemented in the context of a multi-tenant, "cloud" based environment (such as a multi-tenant business data processing platform), typically used to develop and provide services for end users. This exemplary implementation environment will be described with reference to FIGS. 2 and 3. Note that embodiments of the invention may also be implemented in the context of other computing or operational environments or systems, such as for an individual business data processing system, a private network used with a plurality of client terminals, a remote or on-site data processing system, another form of client-server architecture, etc.

Modern computer networks incorporate layers of virtualization so that physically remote computers and computer components can be allocated to a particular task and then reallocated when the task is done. Users sometimes speak in terms of computing "clouds" because of the way groups of computers and computing components can be formed into units and then be split back into configurable components in response to user demand, and because users often never see the computing hardware that ultimately provides the computing services. More recently, different types of computing clouds and cloud services have begun emerging.

For the purposes of this description, cloud services may be divided broadly into "low level" services and "high level" services. Low level cloud services (sometimes called "raw" or "commodity" services) typically provide little more than virtual versions of a newly purchased physical computer system: virtual disk storage space, virtual processing power, an operating system, and perhaps a database such as an RDBMS. In contrast, high or higher level cloud services typically focus on one or more well-defined end user applications, such as business oriented applications. Some high level cloud services provide an ability to customize and/or extend the functionality of one or more of the end user applications they provide; however, high level cloud services typically do not provide direct access to low level computing functions.

The ability of business users to access crucial business information has been greatly enhanced by the proliferation of IP-based networking together with advances in object oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include (but are not required to include, nor limited to only including): accounting, order processing, time and billing, inventory management, employee management/payroll, human resources management, and employee calendaring and collaboration, as well as reporting and analysis capabilities relating to these functions.

In a related development, substantial efforts have also been directed to integrated Customer Relationship Management (CRM) systems, with a view toward obtaining a better understanding of customers, enhancing service to existing customers, and acquiring new and profitable customers. By way of example, the capabilities or modules of a CRM system can include (but are not required to include, nor limited to only including): sales force automation (SFA), marketing automation, contact list management, call center support, and web-based customer support, as well as reporting and analysis capabilities relating to these functions. With differing levels of overlap with ERP/CRM initiatives and with each other, efforts have also been directed toward development of increasingly integrated partner and vendor management systems, web store/eCommerce systems, product lifecycle management (PLM) systems, and supply chain management (SCM) systems.

Figure 2:
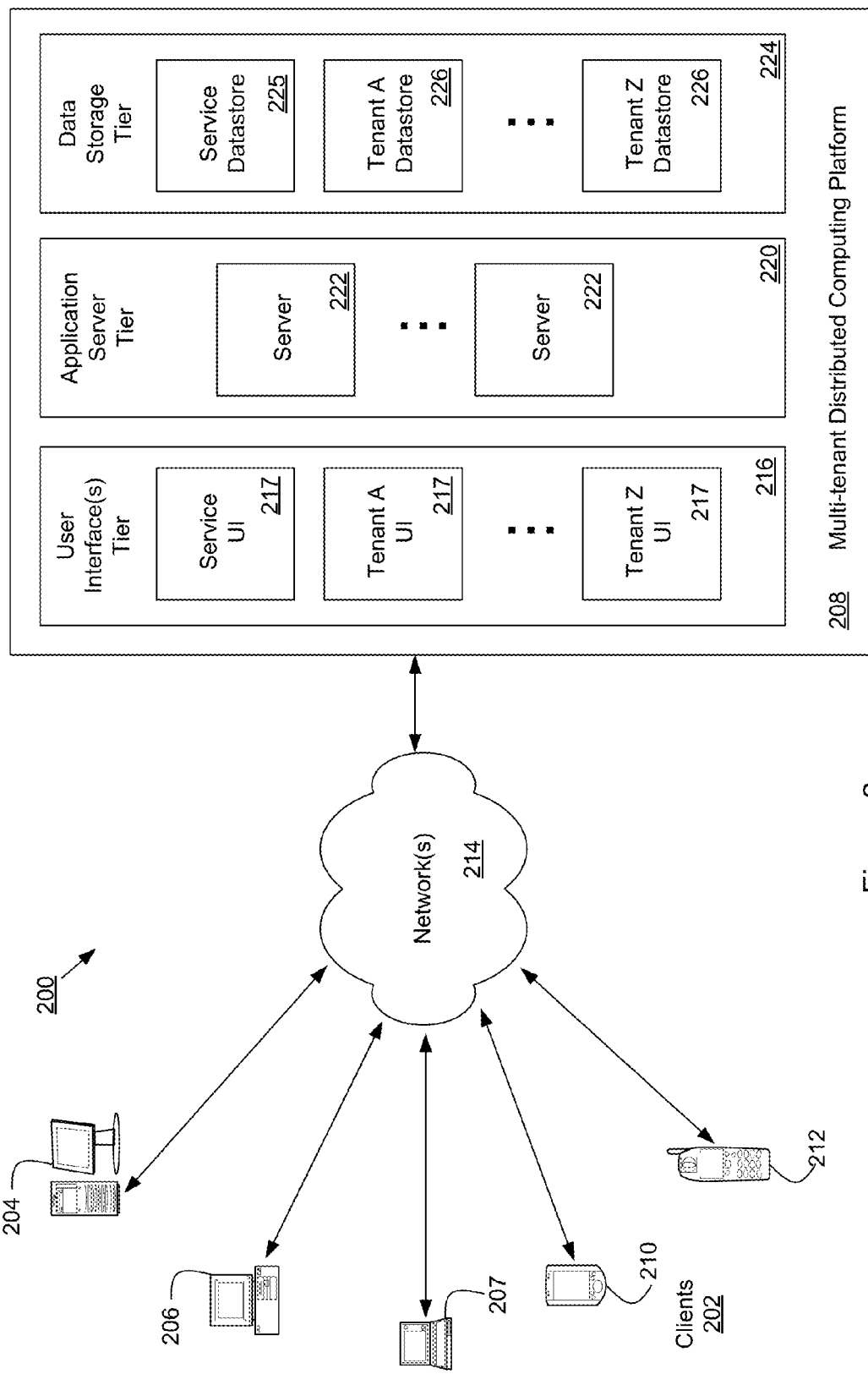
FIG. 2 is a diagram illustrating elements or components of an example operating environment in which an embodiment of the invention may be implemented.

FIG. 2 is a diagram illustrating elements or components of an example operating environment 200 in which an embodiment of the invention may be implemented. As shown, a variety of clients 202 incorporating and/or incorporated into a variety of computing devices may communicate with a distributed computing service/platform 208 through one or more networks 214. For example, a client may incorporate and/or be incorporated into a client application (e.g., software) implemented at least in part by one or more of the computing devices. Examples of suitable computing devices include personal computers, server computers 204, desktop computers 206, laptop computers 207, notebook computers, tablet computers or personal digital assistants (PDAs) 210, smart phones 212, cell phones, and consumer electronic devices incorporating one or more computing device components, such as one or more electronic processors, microprocessors, central processing units (CPU), or controllers. Examples of suitable networks 214 include networks utilizing wired and/or wireless communication technologies and networks operating in accordance with any suitable networking and/or communication protocol (e.g., the Internet).

The distributed computing service/platform (which may also be referred to as a multi-tenant business data processing platform) 208 may include multiple processing tiers, including a user interface tier 216, an application server tier 220, and a data storage tier 224. The user interface tier 216 may maintain multiple user interfaces 217, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 224 may include one or more data stores, which may include a Service Data store 225 and one or more Tenant Data stores 226.

Each tenant data store 226 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 208 may be multi-tenant and service platform 208 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include: accounting, order processing, time and billing, inventory management, employee management/payroll, and employee calendaring and collaboration, as well as reporting and analysis capabilities relating to these functions. Another business information system that may be provided as part of an integrated service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system may include: sales force automation (SFA), marketing automation, contact list management, call center support, and web-based customer support, as well as reporting and analysis capabilities relating to these functions. In addition to ERP and CRM functions, a business information system/platform (such as element 208 of FIG. 2) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform.

The integrated business system shown in FIG. 2 may be hosted on a distributed computing system made up of at least one, but typically multiple, "servers." A server is a physical computer dedicated to run one or more software services intended to serve the needs of the users of other computers in data communication with the server, for instance via a public network such as the Internet or a private "intranet" network. The server, and the services it provides, may be referred to as the "host" and the remote computers and the software applications running on the remote computers may be referred to as the "clients." Depending on the computing service that a server offers it could be referred to as a database server, file server, mail server, print server, web server, etc. A web server is most often a combination of hardware and the associated software that helps deliver content (typically by hosting a website) to client web browsers that access the web server via the Internet.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs, as those relate to both its employees and its customers.

For example, each tenant may be a business or entity that uses the multi-tenant platform to provide business data and functionality to multiple users, including employees, different levels of management, or customers. Some of the multiple users may have distinct roles or responsibilities within the business or entity. As a result, such users may have a need or preference to utilize different components of a user interface when performing their respective business functions (such as to have certain functional capabilities available or a display of certain interactive elements). Similarly, different customers of a tenant may have a need or preference to utilize different components of a user interface when accessing the tenant's website (such as for using a feature of an eCommerce site). And, both employee users and customer users may desire to configure a user interface to suit their needs when accessing a website or data using a specific type of client device (such as a mobile device as compared to a desktop device).

Embodiments of the invention provide a method for enabling a user interface to an application, a system, a device, a network, a terminal, or another element to be configured in accordance with the user's usage behavior for that interface. Thus, in one example embodiment, the data entry fields available on a form may be presented to a user in accordance with (or in some way based on, or derived from) that user's previous use of the form, so that the fields typically (e.g., frequently) used are presented while fields typically not used are not presented. This may provide a more efficient data entry format for users of mobile devices or other situations with limited screen landscape. In another use case, the user interface elements, menus, selectable features, etc. may be configured in accordance with the business role or responsibilities of the user in order to present the user with the set of features most relevant to their role in a business based on their previous usage of the user interface.

Figure 3:
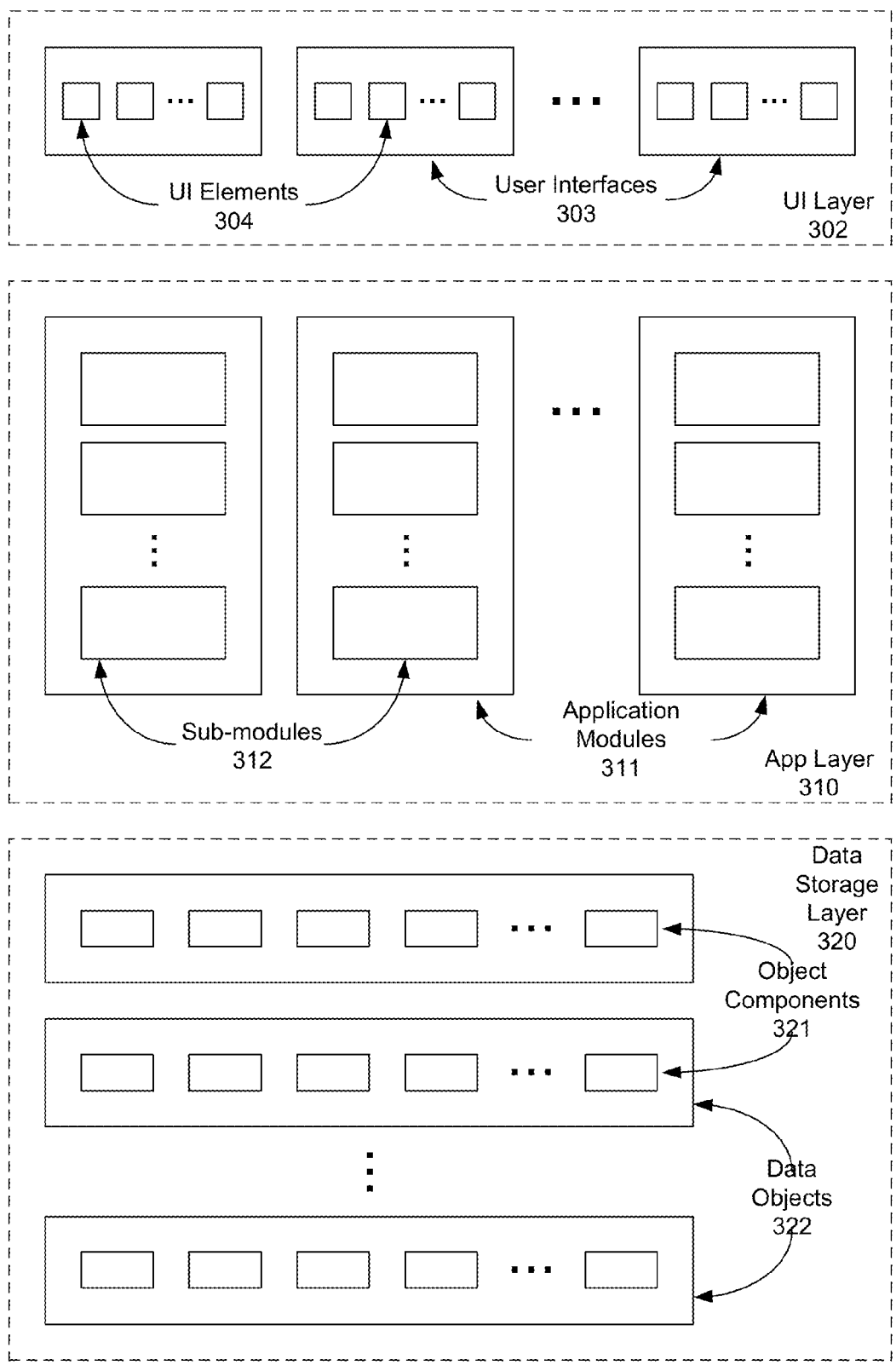
FIG. 3 is a diagram illustrating additional details of the elements or components of the multi-tenant distributed computing service platform of FIG. 2, in which an embodiment of the invention may be implemented.

FIG. 3 is a diagram illustrating additional details of the elements or components of the multi-tenant distributed computing service platform of FIG. 2, in which an embodiment of the invention may be implemented. The software architecture depicted in FIG. 3 represents an example of a complex software system to which an embodiment of the invention may be applied or in which it may be incorporated. In general, an embodiment of the invention may be used in conjunction with any set of software instructions that are designed to be executed by a suitably programmed processing element (such as a CPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 3 is a diagram illustrating additional details of the elements or components 300 of the multi-tenant distributed computing service platform of FIG. 2, in which an embodiment of the invention may be implemented. The example architecture includes a user interface layer or tier 302 having one or more user interfaces 303. Examples of such user interfaces include graphical user interfaces and application programming interfaces (APIs). Each user interface may include one or more interface elements 304. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols.

As described herein, embodiments of the invention provide a method for configuring aspects of a user interface (such as the data entry fields of a form or a set of interface elements presented to a user, employee, customer, etc.) by specifying one or more user interface elements to present to a specified user. The user interface presented may be for a user of a subset of the functionality of the multi-tenant platform (such as an employee of a business or a customer of a business), for an administrator of an account for which the platform provides data storage and data processing capabilities, for a user of a mobile device or other client device that interacts with the platform, for a user desiring to enter data onto a form or webpage, etc.

The application layer 310 may include one or more application modules 311, each having one or more sub-modules 312. Each application module 311 or sub-module 312 may correspond to a particular function, method, process, or operation that is implemented by the module or sub-module (such as a CRM, ERP, eCommerce function or task). Such function, method, process, or operation may include those used to implement one or more aspects of the inventive system and methods, such as for:

tracking the data entry fields of a form (or other UI elements) that are used by a user;

determining an identifier associated with each data entry field (or other UI element);

processing the tracked information to determine which data entry fields to present to that user in the future (in accordance with a counting, ranking, statistical analysis process, machine learning model, predictive model, rule-based model, or other suitable method);

encoding the determined set of data entry fields into a binary number representation (or other suitable representation) defining which fields or UI elements to present to the user for future use by the user;

if desired, filtering or adjusting the binary number based on one or more of a set of business rules, user preferences, security rules, access control rules, or role-based rules (such as for a manager of a specific department or a person in a position of making certain types of decisions) to reflect a revised set of fields or UI elements to present to the user, etc. Note that this filtering/adjusting may take into account certain aspects of a form or UI that are required to always be present, certain aspects that a specific user is not entitled to view or enter data into, certain aspects that a user by virtue of their business role is required to respond to, etc.;

converting the binary number representation into a decimal number (or other suitable representation);

storing information about the form (or other set of UI elements), the user, and the decimal number (or other suitable representation) in a suitable data storage element;

accessing the stored information (or transferring the stored information to another device or process) at a later time to enable configuration of the form's data entry fields (or UI elements) for that user;

where applicable, adaptively altering the data fields (or other UI elements) presented to the user at a later time based on tracking the usage or continued usage of the fields (or other UI elements) presented to the user (for example to remove fields or elements that are not being used with the frequency expected, to add fields or elements that are being used at a higher rate than previously, or to add fields that may be useful based on a new application, responsibility, function, etc.);

determining and implementing a user defined "hide-threshold" value of UI element usage, which when set will cause a field or fields to be hidden if the UI element usage is lower than the hide-threshold value, or show the field(s) if the UI element usage is equal to or greater than the hide-threshold value;

if desired, using a form of the previous data field (or other UI element) usage data as a "key" for purposes of encoding/decoding new data field usage data (and/or other elements or data) before exchanging the new data (thereby enabling secure transmission of updates to the usage data, the sending of "diffs", etc.), as described with reference to FIGS. 6 and 7; and if applicable, accessing the "key" and receiving newly generated usage data, and using the key to decode the received encoded data to update the presented fields or UI elements, as described with reference to FIGS. 6 and 7.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 222 of FIG. 2) may include each application module. Alternatively, different application servers may include different sets of application modules. Such sets may be disjoint or overlapping.

The data storage layer 320 may include one or more data objects 322 each having one or more data object components 321, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 2-3 are not intended to be limiting examples. Alternatively, or in addition, computing environments in which an embodiment of the invention may be implemented include any suitable system that uses a user interface or data entry element to permit users to interact with a process, device, or apparatus. This may include, for example, providing data to, accessing data, controlling the processing of data, or otherwise utilizing data stored in a data storage element (e.g., a database). Further example environments in which an embodiment of the invention may be implemented include devices (including mobile devices), software applications, systems, apparatuses, terminals, networks, or other configurable components that may be used by multiple users for data entry, data processing, control of application execution, data review, etc. and which have user interfaces or user interface components that can be configured to present a personalized or customized interface to a user. Although further examples below may reference the example computing environment depicted in FIGS. 2-3, it will be apparent to one of skill in the art that the examples may be adapted for alternate computing devices, systems, apparatuses, processes, and environments. Note further that although parts of the description of the invention provided herein refer to a user interface, such interfaces may include forms with data entry fields, templates, web pages, or other forms of interfaces that permit data entry, selection of one or more desired options, etc.

Figure 4:
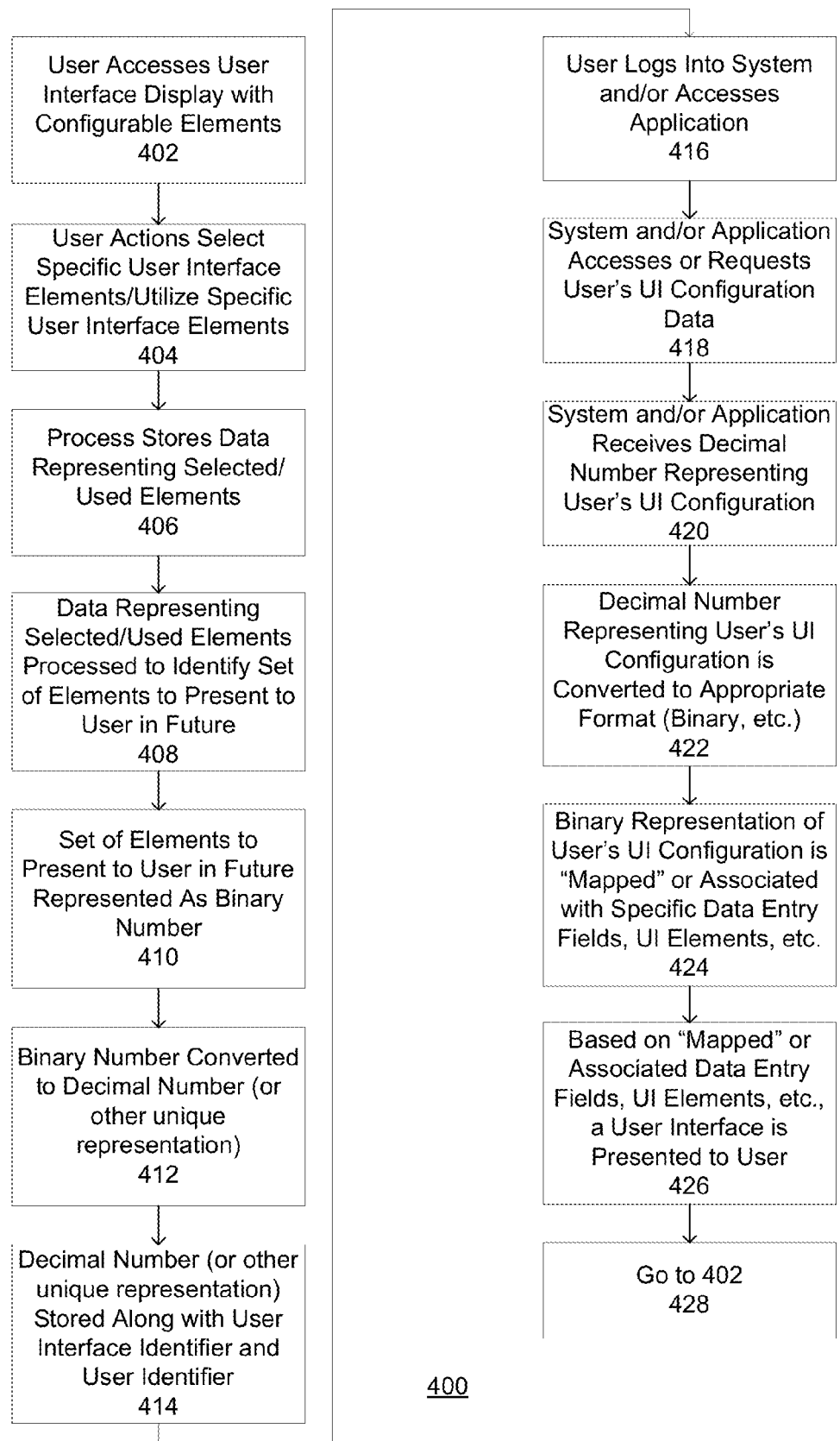
FIG. 4 is a flow chart or flow diagram illustrating a process, method, operation, or function for configuring a user interface based on the user's previous behavior that may be used when implementing an embodiment of the invention.

FIG. 4 is a flow chart or flow diagram illustrating a process, method, operation, or function 400 for configuring a user interface based on the user's previous behavior that may be used when implementing an embodiment of the invention. As shown in the figure, in one embodiment, a user of a system, device, terminal, network, apparatus, or process may access a user interface display having one or more configurable elements (step or stage 402). In one embodiment, the accessed user interface display may be a user interface screen, a form for data entry, a collection of user interface elements, a set of selectable elements or controls, a webpage, etc.

Next, the user may interact with the user interface display, and by doing so select or otherwise use one or more user interface elements (such as buttons, drop-down menus, selectable elements that control some aspect of a device or process, etc.) and/or utilize specific elements (such as certain data entry fields in a form, certain controls or configurable parameters, etc.), as suggested by step or stage 404. A data processing or computing device (e.g., the multi-tenant data processing platform described herein, a networked server, etc.) that is executing an embodiment of the inventive method will then store data representing the selected and/or accessed user interface elements (step or stage 406). This may be performed, for example, by storing data identifying the user, data identifying the user interface (e.g., an identifier for the form, webpage, or interface template), and data sufficient to identify the selected and/or accessed user interface elements (such as a list of identifiers for those elements used, a list of all elements and an indicator of whether they were used, a chart indicating which elements were used, etc.). Such a set of data may be stored for one or more uses of the user interface display by the user. For example, in one embodiment, such usage data may be collected over a specified period of time or for a certain number of accesses of the interface display by a user prior to further processing. This may be done to obtain a more accurate or realistic view of the type of elements used and the frequency of use of those elements over time.

Such a set or sets of data may then be processed and subjected to one or more decision or evaluation processes in order to determine a set of user interface elements (e.g., the data entry fields of a form or selectable elements of a display) to present to the user in the future (step or stage 408). This processing or other form of evaluating the stored usage data may take any suitable form, including but not limited to ranking in order of frequency of use (and if desired, application of a threshold process to determine a subset of the used elements that satisfy some criterion), ranking in order of frequency of use as biased by consideration of a related parameter, generating a "predicted" set of elements expected to be used by the user for a particular situation based on collaborative filtering or the output of a machine learning model, generating a set of elements expected to be used based on usage by another person, group, or entity that has something in common with the user, etc.

In addition or instead, a business rule or rules may be applied to determine a set of user interface elements that it is desired a specific client or set of users use, such as those required by a business or process, or required due to the role a user has in an organization (e.g., such as providing final approval of some action or expense). Further, the resulting data may be filtered or otherwise modified to emphasize or de-emphasize the use of certain elements based on a rule, security policy, access control policy, expected trend, a desire to determine the impact of certain elements on users' preferences, the role of the user within an organization, etc.

The result of the processing, evaluation, filtering, or other analysis will be data indicating a set of user interface elements that the user is expected (and in some cases, required) to use in the future when accessing that user interface display screen. This set of expected elements may then be represented by a binary number (step or stage 410). In one embodiment, each numeral (i.e., one or zero) in the binary number represents that a particular element is either used (typically represented by a 1) or not used (typically represented by a 0) by the user. The location of the 1 or 0 in a string may be mapped or otherwise associated with a specific user interface element, a region on a user interface display, a data field, etc. For example, each numeral occupies a specific position, where that position may be associated with a particular user interface element (such as a field in a data entry form). Thus, in one sense the binary number represents an encoding or representation of the result of processing the usage data. Note that the binary representation may be further filtered or adjusted in accordance with a business rule, security policy, access control policy, user role, etc. (e.g., by changing a "0" to a "1" for an element that should always be presented to the user regardless of actual usage frequency).

The binary representation of the user interface configuration for the user is then converted to a decimal number (step or stage 412). The decimal number thus represents the set of user interface elements that will be presented to that user in the future. The decimal number may then be stored, along with an identifier for the user and an identifier for the user interface display to which the usage data applies (stage or step 414). Note that although a binary representation and/or a decimal representation of the user's usage data have been described, embodiments of the invention are not limited to being implemented using those representations. Other representations of the encoded data or of a converted (or encrypted) form of the encoded data may be used, provided that there is a way to process the converted form (e.g., the decimal value) to a unique representation of information (e.g., the binary number) which can be mapped to a specific set of user interface elements. As described herein, this may be accomplished by exchange or determination of a shared "key" that is used to determine an encoding/encryption method, where that key may be valid for only a single use or session.

At a later time, the same user (or one to whom the same user interface configuration applies) logs into a system and/or accesses an application having a configurable user interface (stage or step 416). This may mean that the user executes an application or service having a user interface display (such as a form to be filled in), or uses a device or terminal to log into a platform or network. In response, the system and/or application accesses or requests the user's user interface configuration data (stage or step 418). This may occur as a result of the system or a computing element within the system determining the application or display the user has accessed, which along with the user's identifier (such as may be obtained via the login process), provides sufficient information to lookup or otherwise access and retrieve the stored configuration data. Next, in one embodiment the system and/or application receives the decimal number representing the user's user interface configuration (stage or step 420).

Next, the decimal number representing the user's user interface configuration is converted to the appropriate format or type (e.g., binary), as illustrated in stage or step 422. The converted representation is then mapped or otherwise associated with one or more specific data entry fields, UI elements, etc. (stage or step of 424). This may be performed as a result of comparing the binary representation to a stored index, table, or list that associates each number location in a string of numbers to a specific user interface element, data entry field on a form, item, etc. For example, below is an example of a chart or index that may represent an association between each numeral location and a specific user interface element:

| Number Location (starting at right most position) | $1^{st}$ | $2^{nd}$ | $3^{rd}$ | $4^{th}$ | $5^{th}$ | $6^{th}$ | 7th |
|---|---|---|---|---|---|---|---|
| Data Entry Form Field ID/Name | Name | Title | Location | Task | Date | Format | Order |

Thus, in the above example, a binary number given by 1111101 would result in the form being presented to the user where the data entry fields for all but "Format" were presented. Similarly, a binary number given by 1111100 would result in the form being presented to the user where the data entry fields for all but "Format" and "Order" would be presented to the user. In another example, the numbers in the string might correspond to specific user interface options (such as activate-able buttons, system settings, network configurations, portlets or display regions, etc.) that may be presented to a user.

Note that the mapping, table, or other form of associating each user interface element with the position of a number in a string is also typically used in the converse sense to encode or represent the processed usage data in the form of a string of numbers. For example, if the processing of a user's use of user interface elements (such as data entry fields of a form) determines that the fields for "Name", "Title", "Task", and "Date" should be presented to the user, then that would be encoded or represented as the binary number "1101100" when stored or subjected to other processing.

Next, the user interface elements that are determined to be represented by the binary number are presented to the user (stage or step 426). This may mean that certain fields (but not others) of a form are presented, that certain user interface elements are presented while others are not (such as buttons, links, etc.), that certain functions or capabilities are presented while others are not (e.g., save, delete, share, but not copy), that certain folders are presented, that certain system functions are enabled or disabled, that certain network configurations are enabled or disabled, that certain functions are highlighted or rendered inactive, etc. At this point the process may return to step or stage 402 to collect information regarding the user's use of the presented user interface elements during the current use or session, and thereby to refine those presented to the user at a later time based on the relative usage of the presented and/or other user interface elements. This adjustment may be accomplished by use of a suitable adaptive or iterative process (stage or step 428), such as an adaptive control process that compares the current session's use with previous use data and makes an adjustment based on the differences and an applicable rule, statistical analysis, or model.

Note that although an embodiment of the invention has been described in which the user interface usage data is represented as a binary number and then converted to a decimal number, embodiments of the invention are not limited to this implementation. For example, the decimal number may be converted to or represented by a hexadecimal number or other form which may be converted back to a unique binary representation. Similarly, the decimal number or binary representation may be encoded or encrypted using a suitable "key" before being stored or transferred to a requesting system or application. The key may be one that is exchanged between the user and the system or application, one that is selected from a list or table according to an agreed upon process, one based on previous usage data (in which case the previous data may serve as a seed for generating a key or as a baseline value to which a difference term is added), etc.

The following provide examples of the collection and processing of user interface element usage data, and the use of an encoding and encryption process to represent the usage data for purposes of security or access control in the storage and transfer of the usage data, and represent one or more possible embodiments of the invention:

Define the following:

$F_4$—a UI Form/table/page with 4 fields
f#—Field #
$X_{Bin}$—Key in the binary format
$X_{Dec\text{-}Old}$—Old Key based on the old use of the UI Elements in the decimal format
$X_{Dec\text{-}New}$—New Key based on the new use of UI Elements in the decimal format
$X_{Dec\text{-}ReGen}$—Regenerated Key on server in the decimal format
$P_{D\text{-}Bin}$—Decrypted Payload Data in Binary
$P_{E\text{-}Bin}$—Encrypted Payload Data in Binary For this example embodiment, assume a "hide frequency threshold" value of <=50% of the highest frequency (this is typically a configurable property), meaning that if a field is used less than 50% of the highest frequency of use amount when a form is accessed, then the field is hidden in later accesses (this may be done in a similar manner for other UI elements).

Initial Use (Use Case #1):
1. User uses a form say $F_4$ (i.e., with 4 fields) on the browser where he enters data into fields 1, 3, and 4, i.e., $f_3$, $f_4$
2. User submits the form and browser captures the usage data in the binary form ("1" represents that the field is used, while "0" represents that the field was not used during this interaction with the form). Position of the digits in the binary form identifies the corresponding field on the form. The browser generates a key $X_{Bin}$=1011 ($X_{Dec-New}$=0011).
3. Key $X_{Dec-New}$ is then transmitted to the server.
4. The server receives the numeric Key and converts it into $X_{Bin}$. The server then records the information on the user profile:
   a. [$F_4$-$f_1$] frequency=1
   b. [$F_4$-$f_2$] frequency=0
   c. [$F_4$-$f_3$] frequency=1
   d. [$F_4$-$f_4$] frequency=1.

Next Use of Form (Use Case #2):
1. User again requests to use form $F_4$ on the browser.
2. The server reads the frequency data from the user profile for the matching form and loads in $X_{Dec-Old}$=0011 and sends it to the browser.
3. The browser receives the key and converts into its binary equivalent $X_{Bin}$=1011; Using this key, the browser shows fields or data entry regions $f_1$, $f_3$, $f_4$ and hides $f_2$. This is based on the hide-frequency threshold value.
4. The user updates $f_1$ & $f_4$ and submits the form. At this point the browser generates a new key $X_{Bin}$=1001, converts it to its decimal equivalent ($X_{Dec-New}$=0009) and sends it to the server.
5. The server receives number $X_{Dec-New}$ and converts it into $X_{Bin}$. The server then records the information on the user profile:
   a. [$F_4$-$f_1$] frequency=2
   b. [$F_4$-$f_2$] frequency=0
   c. [$F_4$-$f_3$] frequency=1
   d. [$F_4$-$f_4$] frequency=2

Note that the server side logic that determines the new key may operate in a manner such as the following:
Because highest frequency is 2, fields $f_1$ & $f_4$ have the highest frequency. $f_2$ has a frequency=0, which is <50% of $f_1$ & $f_4$. Similarly, $f_3$ has a frequency=1, which =50% of $f_1$ & $f_4$. Therefore, next time when this form is requested by the same user, the key generated by the server will be $X_{Bin}$=1001.

Next Use of Form (Use Case #3):
1. The user again requests to use form $F_4$ on the browser.
2. The server reads the frequency data from the user profile for the matching form and loads in $X_{Dec-Old}$=0009 and sends it to the browser.
3. The browser receives the key and converts into its binary equivalent $X_{Bin}$=1001. Using this key, the browser shows $f_1$, $f_4$ and hides $f_2$, $f_3$.
4. The user updates $f_1$ and submits the form. At this point the browser generates a new key $X_{Bin}$=1000. The browser converts it to decimal equivalent ($X_{Dec-New}$=0008) and sends it to the server.
5. The server receives number $X_{Dec-New}$ and converts it into $X_{Bin}$. The server then records the information on the user profile:
   a. [$F_4$-$f_1$] frequency=3
   b. [$F_4$-$f_2$] frequency=0
   c. [$F_4$-$f_3$] frequency=1
   d. [$F_4$-$f_4$] frequency=2

Next Use of Form (Use Case #4):
1. User again requests to use form $F_4$ on the browser.
2. The server reads the frequency data from the user profile for the matching form and loads in $X_{Dec-Old}$=0009 and sends it to the browser.
3. The browser receives the key and converts into its binary equivalent $X_{Bin}$=1001. Using this key, the browser shows $f_1$, $f_4$ and hides $f_2$, $f_3$.

As noted, features of the inventive method may be used for purposes of encryption/decryption based on an exchange of a suitable "key" or "keys". For example in use case #2 above:
[$F_4$-$f_1$] Data Value="Suhas Menter"
[$F_4$-$f_2$] Data Value=" "
[$F_4$-$f_3$] Data Value="Business Inc."
[$F_4$-$f_4$] Data Value="smenter@business.com"

In this example the data payload is a collection of all the form data values; assume that the $P_{D-Bin}$ in use case #2 is represented by "101011101101".
1. The user again requests to use form $F_4$ on the browser.
2. The server reads the frequency data from the user profile for the matching form and loads in $X_{Dec-Old}$=0011.
3. The server uses this key ($X_{Dec-Old}$=0011) to encrypt the field data on the server-side.
   a. In one example, the encryption algorithm will circular right-shift the $P_{D-Bin}$ by the lowest decimal digit in $X_{Dec-Old}$ (which is "1"), and generate $P_{E-Bin}$=110101110110.
4. The encrypted data payload and the key are sent to the browser separately.
5. The browser receives the key and encrypted data payload.
6. The browser uses the key to decrypt the data and converts the key into its binary equivalent $X_{Bin}$=1011.
   a. The browser uses the $X_{Dec-Old}$=0011 as the shared key and decrypts the $P_E$ by performing a circular left-shift by the lowest decimal digit in $X_{Dec-Old}$ (which is "1") to generate the decrypted payload data of $P_{D-Bin}$=101011101101.
7. Using this key $X_{Bin}$, the browser shows fields $f_1$, $f_3$, $f_4$ and hides $f_2$. The decrypted data is shown on the UI.
8. The user updates $f_1$ & $f_4$ as below.
   a. [$F_4$-$f_1$] Data Value="Suhas P Menter"
   b. [$F_4$-$f_4$] Data Value="srmenter@business.com"
9. The user submits the form with the updated data to the server. Here the data payload is a collection of all of the form data values, and assume for this example that $P_{D-Bin}$="011011101011".
10. Based on the new usage, the browser generates a new key $X_{Bin}$=1001. The browser converts it to decimal equivalent ($X_{Dec-New}$=0009).
11. The browser then encrypts the field data, new key ($X_{Dec-New}$=0009) & old key ($X_{Dec-Old}$=0011). The browser uses the old key ($X_{Dec-Old}$=0011) for the encryption.
   a. Now in addition to the form data, the payload also consists of the new key ($X_{Dec-New}$=0009). The browser encrypts the payload by performing a circular right-shifting the binary by the lowest decimal digit in $X_{Dec}$ (which is "1"), to generate $P_{E\text{-}Bin}$=101101110101.

12. The server receives the encrypted data.
13. The server regenerates the old key ($X_{Dec\text{-}Old}$=0011) and uses this to decrypt the data.
   a. The browser decrypts the payload by performing a circular left-shifting of the binary by the lowest decimal digit in $X_{Dec\text{-}Old}$ (which is "1"), to generate $P_{D\text{-}Bin}$=011011101011.
14. After decryption, the server compares the decrypted old key ($X_{Dec\text{-}Old}$=0011) with the regenerated old key ($X_{Dec\text{-}ReGen}$=0011). If the values match, then the server updates the decrypted fields data in the database. The server then uses the decrypted new key ($X_{Dec\text{-}New}$=0009) and converts it into binary ($X_{Bin}$=1001), and updates the frequency data as below:
   a. [$F_4$-$f_1$] frequency=2
   b. [$F_4$-$f_2$] frequency=0
   c. [$F_4$-$f_3$] frequency=1
   d. [$F_4 f_4$] frequency=2.

Note that the server side logic that determines the new key may operate in a manner such as:
   Because highest frequency is 2, fields $f_1$ & $f_4$ have the highest frequency. $f_2$ has a frequency=0, which is <50% of $f_1$ & $f_4$. Similarly, $f_3$ has a frequency=1, which =50% of $f_1$ & $f_4$. Therefore, next time when this form is requested by the same user the key generated by the server will be $X_{Bin}$=1001.

As described herein, the inventive system and methods provide a way to configure a user interface or interfaces in an efficient manner that is based on determining those interface elements most commonly or likely to be used by the user and enabling that information to efficiently be stored and transported to a device as part of implementing a user interface. In some use cases, this can provide a more cost-effective and efficient way of configuring and providing access to a user interface than conventional approaches. For example, consider the use case of a customer service representative using a UI form that has a large number of fields (e.g., more than 100) of different kinds for data entry, where the fields are logically grouped on the UI. As might be expected, not all of the fields are used by a specific user on a regular basis. In some cases there may be mandatory fields at the bottom of a UI form, which means that a user has to either tab-through the page to get to a field they need to provide data for, or use a mouse to navigate on a single UI form. Both of these actions take time away from the user's productivity and make it difficult to perform in certain situations or when using certain devices. For example, given the complexity of a typical UI, it may be safe to assume that a customer service representative is wasting as much as a minute of time for every 15 minutes of work, or roughly 5.33 days/year/person. An embodiment of the invention could be used to significantly reduce this amount of lost time.

Figure 5:
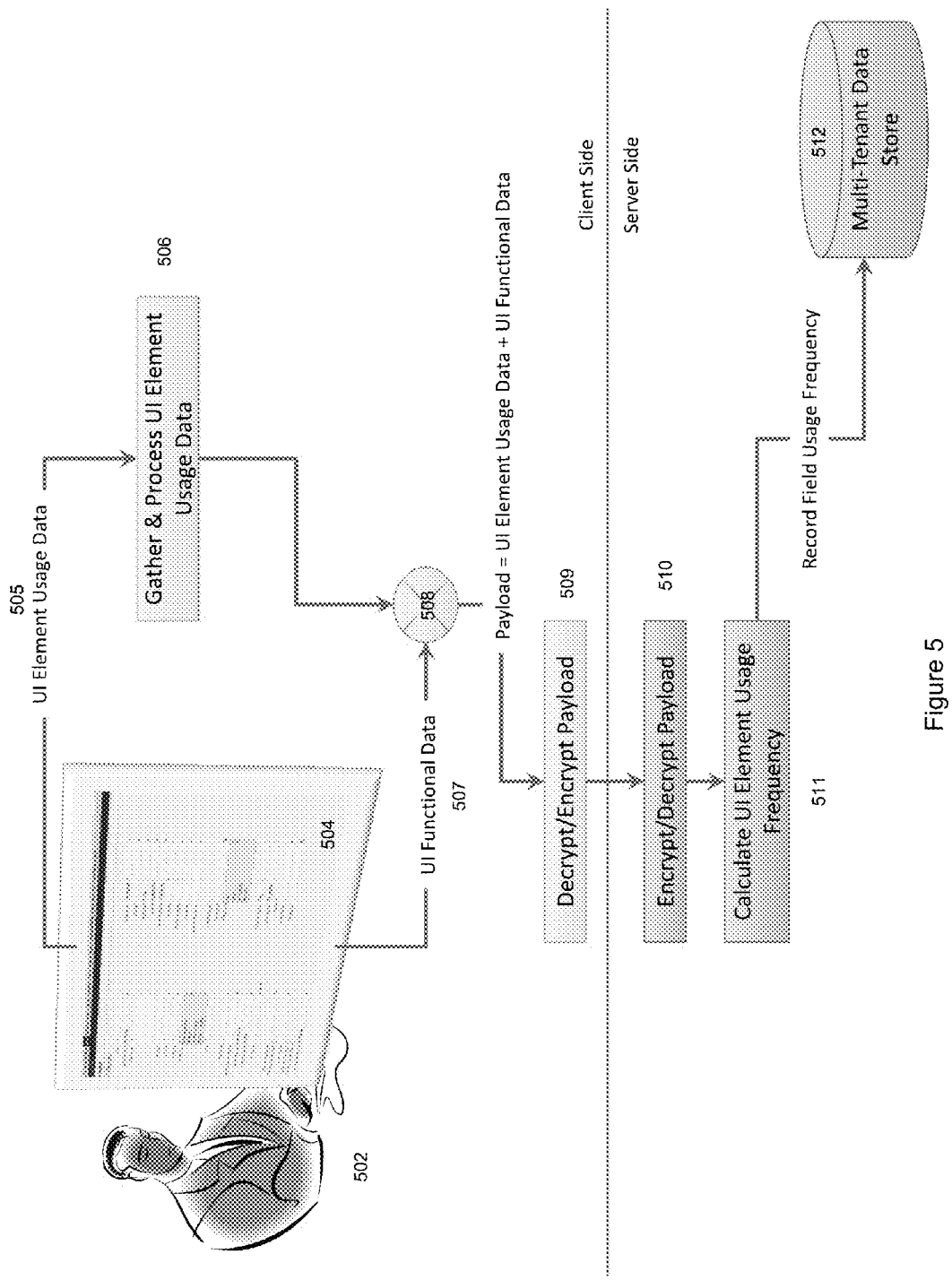
FIG. 5 is a diagram illustrating a user entering data into a form or template, and a process or processes to determine and store field usage data that may be implemented as part of an embodiment of the invention.

In one embodiment, the user interface element data may be used as a form of security "key" to enable the encryption and decryption of data, and to ensure that updated usage data is correct and being provided from a reliable source. FIG. 5 is a diagram illustrating a user entering data into a form or template, and a process or processes to determine and store field usage data that may be implemented as part of an embodiment of the invention. As shown in the figure, a user 502 enters data into a form or template 504 (where the data entered may represent a selection of an option, entry of data into a field, etc.). A client side process 506 obtains the UI element/field usage data 505 and processes it as needed. As suggested by the figure, separate functional data or information (e.g., information about a user interface form, template structure, field definitions, field identifications, field values, etc.) 507 may be combined with the processed UI element/field usage data (as suggested by operation 508) to form a "payload". The payload may then be subjected to an encryption process 509 prior to being made available to a remote server for server side processing. A server process 510 may then decrypt the payload and determine the frequency of use or predicted frequency of use data for that user interface display when used by that user 511. This information may be determined by any suitable method or process, including but not limited to (or requiring to include) counting, ordering, sorting, statistical analysis, modeling, machine learning, etc. The field usage data and/or frequency of use/predicted frequency of use data is then typically stored in a database 512 or other data storage element that is accessible by the server side process (such as a multi-tenant data processing platform database).

Figure 6:
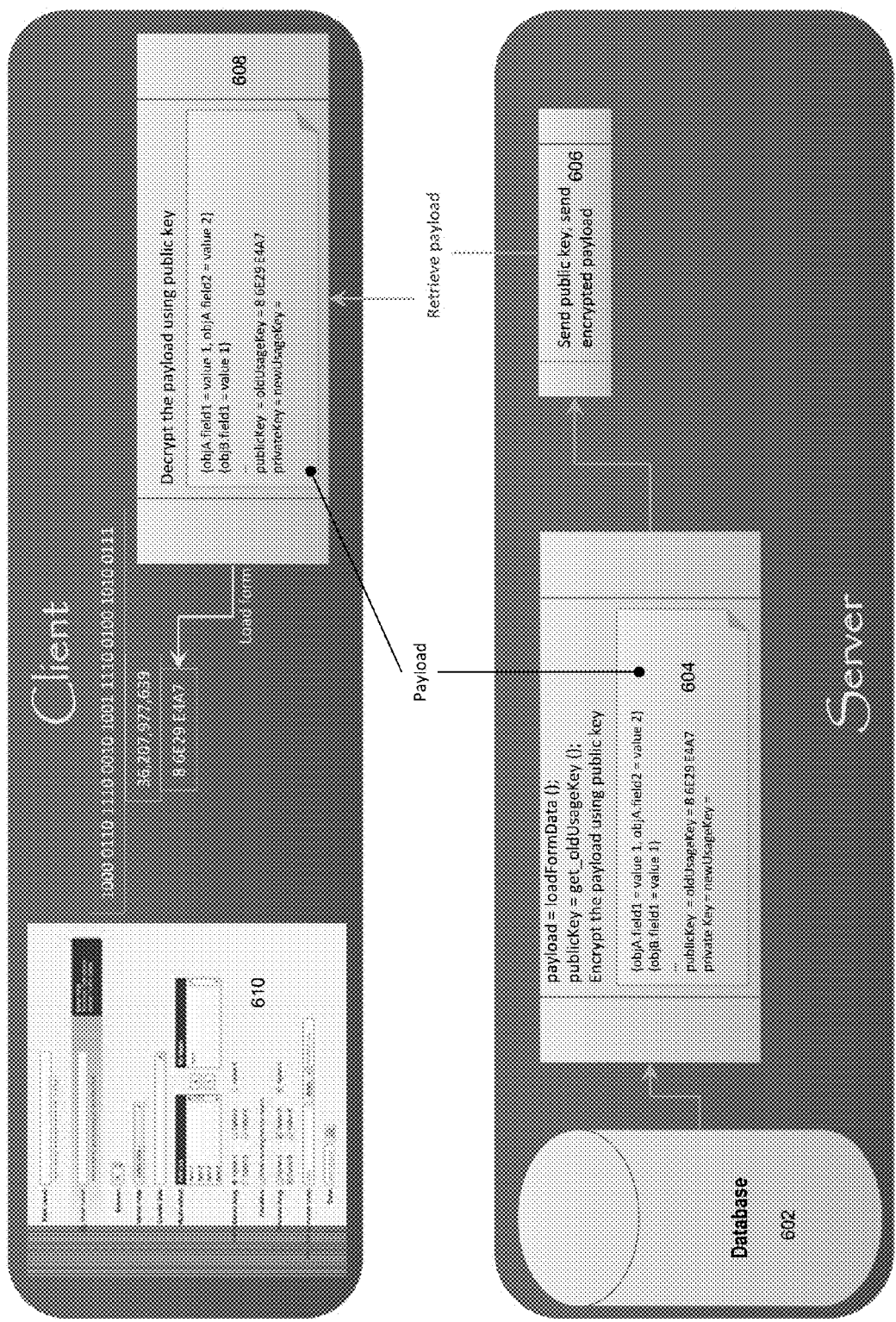
FIG. 6 is a flow chart or flow diagram illustrating a process, method, operation, or function for accessing user interface data stored in a database and securely transferring that data to a client device in order to display a desired user interface, and that may be implemented as part of an embodiment of the invention.

FIG. 6 is a flow chart or flow diagram illustrating a process, method, operation, or function for accessing user interface data stored in a database and securely transferring that data to a client device in order to display a desired user interface, and that may be implemented as part of an embodiment of the invention. As shown in the figure, the primary steps or stages of the illustrated process are as follows:
   a. A server receives a request (on behalf of a specific user) to load a UI form/template (with the associated user interface data defining the fields, options, or data to be displayed to that user), with the form and/or data stored in a database (element 602);
   b. In addition to fetching the UI defining data (which may have been encrypted) and the form or template, the server also loads data termed the "oldUsageKey" as a "publicKey" (this is a version of the UI defining data, possibly in encrypted form);
   c. Next, a "payload (604)" is defined, which will include the
      i. form—to be loaded;
      ii. data—to be shown on the UI; and the
      iii. publicKey=oldUsageKey=8 6E29 E4A7 (in this example);
   d. The server encrypts the payload using a pre-determined algorithm or method:
      i. For example, by performing a circular right-shift of the bits of the payload by a number of places, where the number of places is determined by the number in the units position of the decimal representation of the value of the "publicKey";
      ii. Thus, if the Payload has a bit sequence of "100010001110" that defines those UI elements along with the data in the fields and a decimal value of the public key of 36207977639, then the payload will be circular-shifted to right by 9 bits. The "encrypted" transmitted payload then becomes "010001110100";
   e. The server sends the encrypted payload and the public key to the client (step 606); and
   f. After the client receives the publicKey and the encrypted payload, the client decrypts the received data (stage or step 608):
      i. In this example, the payload is circular-shifted to the left by the number of positions in the units position of the decimal representation of the publicKey;
      ii. For example, if the decrypted payload value for the UI element definition data (obtained by left circular shift of the transferred encrypted payload, 010001110100) is =100010001110, then based on the decrypted data the proper set of UI elements are selected and displayed for that user 610.

Note that while the previous set of usage data is used in one form or another as a key for purposes of encryption of a later set of usage data, the new usage data becomes the key for the next iteration of data encryption and transfer.

Figure 7:
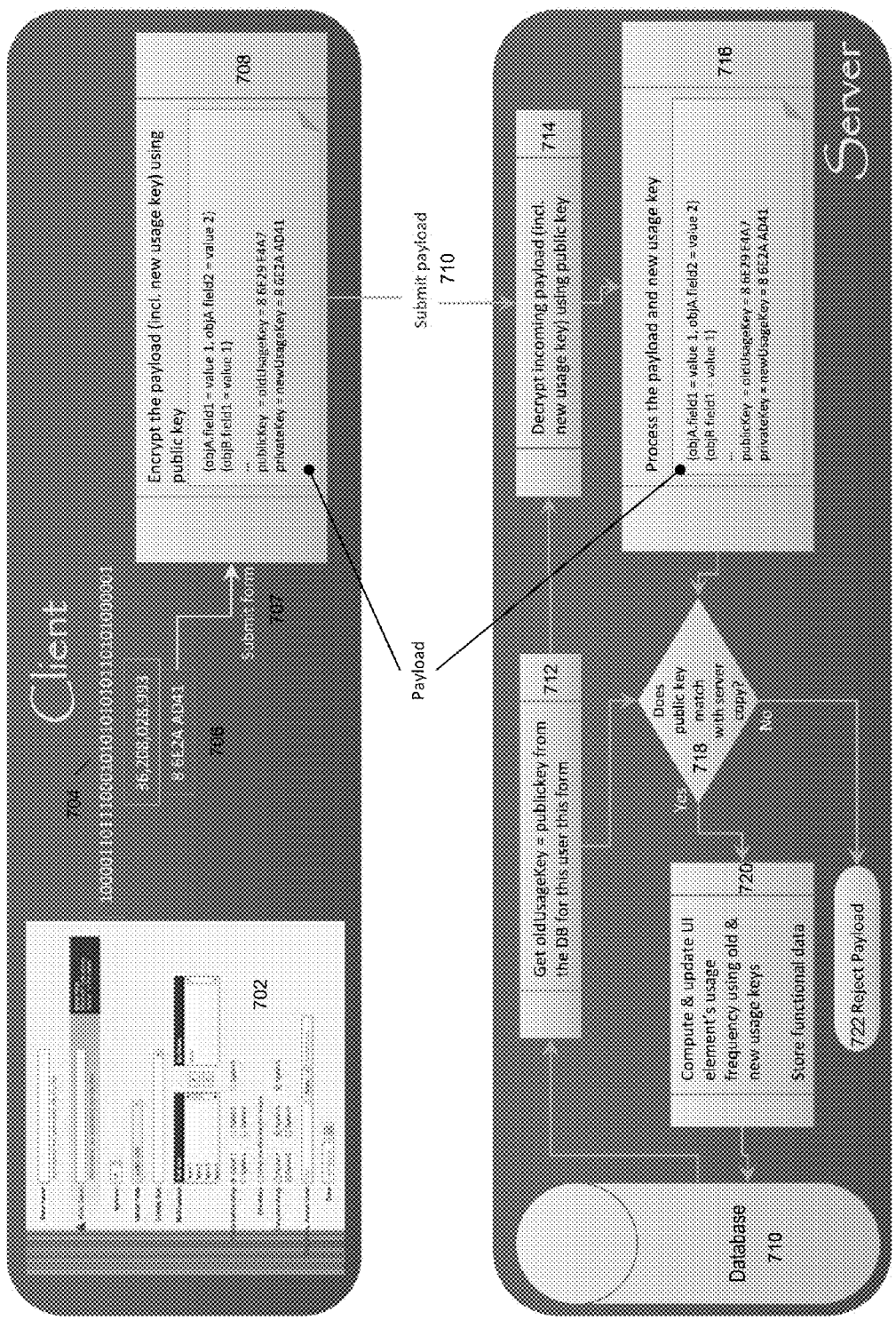
FIG. 7 is a flow chart or flow diagram illustrating a process, method, operation, or function for securely transferring updated user interface data from a client device to a database and then storing that data, and that may be implemented as part of an embodiment of the invention.

FIG. 7 is a flow chart or flow diagram illustrating a process, method, operation, or function for securely transferring updated user interface data from a client device to a database and then storing that data, and that may be implemented as part of an embodiment of the invention. As shown in the figure, the primary steps or stages of the illustrated process are as follows:

a. As the fields are used on a displayed form, template, or other form of UI (element 702), the bits corresponding to those UI elements are set to the appropriate value (e.g., "1" or "0", as shown by string or list 704);

b. The usage data value (in this example a binary number) is then encoded/converted to another representation (e.g., decimal and/or hexadecimal, as illustrated by stage or step 706);

c. When the user submits the form, template, or other type of UI display (707), a value for the "newUsageKey" is determined—in one embodiment, this value may be the encoded/converted form of the usage data and will be used as a value for the "privateKey" as part of a secure data transfer process 708;

d. Next, the payload is defined as:
  i. Field (UI defining) data—to be stored in the database (element 710);
  ii. oldUsageKey (as obtained from the server/database as part of a prior iteration of the UI data (see, for example, step 604 of FIG. 6); and
  iii. newUsageKey=8 6E2A AD41 (for example);

e. A client side process encrypts the payload (stage or step 708) using a pre-determined algorithm or method:
  i. For example, by performing a circular shift-right of the bits of the payload by a number of places, which is determined by the number in the units position of a decimal representation of the value of the publicKey;
  ii. Thus, if the Payload has a bit sequence of "101110001010" and a decimal key value of 36207977639, then the payload will be circular-shifted to the right by 9 bits. The "encrypted" transmitted payload is then "110001010101";

f. The client transmits or otherwise causes the transfer of the encrypted payload to the server/platform (stage or step 710);

g. After the server receives the encrypted payload, a server-side process is executed that:
  i. loads the "oldUsageKey" as a value for the "publicKey" from the database (stage or step 712);
  ii. the payload is decrypted (in this example, circular-shifted to the left by the number of positions as the value in the units position of a decimal representation of the publicKey) (stage or step 714);
  iii. One part of the decrypted payload is the previous UI element usage data (oldUsageKey), which is the publicKey transmitted along with the payload;
  iv. Next, a comparison is made to verify that the key value used to decrypt the payload was the correct one (i.e., that the value of the oldUsageKey provided by the client side process matches the value stored previously in the database during a previous iteration) (stage or step 718); and
  v. If the oldUsageKey provided with the payload is the same as the oldUsageKey retrieved from the database, then the UI data is accepted and stored in the database (stage or step 720); otherwise the payload is rejected (stage or step 722) and if desired, a data error message may be sent to the user.

In accordance with one embodiment of the invention, the system, apparatus, methods, processes, functions, and/or operations for enabling efficient configuration and presentation of a user interface to a user based on the user's previous behavior may be wholly or partially implemented in the form of a set of instructions executed by one or more programmed computer processors such as a central processing unit (CPU) or microprocessor. Such processors may be incorporated in an apparatus, server, network element, client or other computing or data processing device operated by, or in communication with, other components of the system. As an example, FIG. 1 is a diagram illustrating elements or components that may be present in a computer device or system 100 configured to implement a method, process, function, or operation in accordance with an embodiment of the invention. The subsystems shown in FIG. 1 are interconnected via a system bus 102. Additional subsystems include a printer 104, a keyboard 106, a fixed disk 108, and a monitor 110, which is coupled to a display adapter 112. Peripherals and input/output (I/O) devices, which couple to an I/O controller 114, can be connected to the computer system by any number of means known in the art, such as a serial port 116. For example, the serial port 116 or an external interface 118 can be utilized to connect the computer device 100 to further devices and/or systems not shown in FIG. 1 including a wide area network such as the Internet, a mouse input device, and/or a scanner. The interconnection via the system bus 102 allows one or more processors 120 to communicate with each subsystem and to control the execution of instructions that may be stored in a system memory 122 and/or the fixed disk 108, as well as the exchange of information between subsystems. The system memory 122 and/or the fixed disk 108 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, Javascript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A method of configuring a user interface for a user, comprising:
    determining the user's usage data for one or more elements of the user interface;
    processing the usage data to determine a set of user interface elements to present to the user at a later time;
    converting the determined set of user interface elements to present to the user at a later time into a current representation;
    based on the current representation, generating a current key value;
    storing data representing the current key value in a data storage element accessible by the user's client device;
    providing data representing the current representation, the current key value, the user, and the user interface to a remote data processing element;
    at a later time, sending a request to access the user interface for the user to the remote data processing element;
    receiving the request from the user to access the user interface at the remote data processing element;
    operating the remote data processing element to access the current representation and the current key value associated with the user;
    encrypting the current representation using a process dependent on the current key value;
    providing data representing the encrypted current representation, the user, and the user interface to the client device;
    receiving the data representing the encrypted current representation at the client device;
    operating the client device to access the stored data representing the current key value;
    decrypting the data representing the encrypted current representation using the current key value; and
    presenting the user interface to the user based on the decrypted data.

2. The method of claim 1, further comprising:
    determining the user's usage data for one or more elements of the presented user interface;
    processing the usage data to determine a revised set of user interface elements to present to the user at a later time;
    converting the determined revised set of user interface elements into an updated representation;
    based on the updated representation, generating an updated key value;
    encrypting the updated representation using a process dependent on the updated key value; and
    providing data representing the encrypted updated representation, the updated key value, the user, and the user interface to the remote data processing element.

3. The method of claim 1, wherein determining the user's usage data for one or more elements of the user interface comprises determining the number of times that the user selected an option or entered data into a region during a defined time interval or number of uses of the interface.

4. The method of claim 1, wherein processing the usage data to determine a set of user interface elements to present to the user at a later time comprises applying one or more of a statistical analysis, ranking based on frequency of use, ranking based on number of uses, or a machine learning technique to the usage data.

5. The method of claim 1, wherein converting the determined set of user interface elements to present to the user at a later time into a current representation comprises converting the determined set of user interface elements into a binary number representing the element or elements to be presented to the user at the later time.

6. The method of claim 5, wherein based on the current representation, generating a current key value comprises translating the binary number into a decimal number or a hexadecimal number.

7. The method of claim 1, wherein prior to providing the data representing the current representation, the current key value, the user, and the user interface to the remote data processing element, the method further comprises encrypting at least some of the data using a prior key value, where the prior key value was generated based on a representation of a prior set of the user's usage data.

8. The method of claim 1, wherein the one or more elements of the user interface include one or more of a set of data fields into which data may be entered by the user and a set of elements that may be selected or activated by the user.

9. An apparatus comprising:
    an electronic processor programmed to execute a set of instructions;
    an electronic data storage element in which the set of instructions are stored, wherein when executed by the processor the set of instructions cause the apparatus to determine a user's usage data for one or more elements of a user interface;

process the usage data to determine a set of user interface elements to present to the user at a later time, the set of user interface elements including at least one of the elements of the user interface for which usage data has been determined;

convert the determined set of user interface elements to present to the user at a later time into a current representation;

based on the current representation, generate a current key value;

store data representing the current key value in a data storage element accessible by the apparatus;

provide data representing the current representation, the current key value, the user, and the user interface to a remote data processing element;

at a later time, send a request to access the user interface for the user to the remote data processing element;

receive the data representing the encrypted current representation from the remote data processing element;

operate the apparatus to access the stored data representing the current key value;

decrypt the data representing the encrypted current representation using the current key value; and present the user interface to the user based on the decrypted data.

10. The apparatus of claim 9, wherein determining the user's usage data for one or more elements of the user interface comprises determining the number of times that the user selected an option or entered data into a region during a defined time interval or number of uses of the interface.

11. The apparatus of claim 9, wherein processing the usage data to determine a set of user interface elements to present to the user at a later time comprises applying one or more of a statistical analysis, ranking based on frequency of use, ranking based on number of uses, or a machine learning technique to the usage data.

12. The apparatus of claim 9, wherein converting the determined set of user interface elements to present to the user at a later time into a current representation comprises converting the determined set of user interface elements into a binary number representing the element or elements to be presented to the user at the later time.

13. The apparatus of claim 12, wherein based on the current representation, generating a current key value comprises translating the binary number into a decimal number or a hexadecimal number.

14. The apparatus of claim 9, wherein the one or more elements of the user interface include one or more of a set of data fields into which data may be entered by the user and a set of elements that may be selected or activated by the user.

15. A multi-tenant data processing system, comprising:
one or more business related data processing applications installed in the system and accessible by a plurality of tenants of the multi-tenant data processing system;
an electronic data storage element accessible by a plurality of tenants of the multi-tenant data processing system;
an electronic processor programmed with a set of instructions, wherein when executed by the processor the instructions cause the system to
receive a request from a user to access a user interface;
in response to the user request, access a current representation of user interface data associated with the user and a current key value associated with the user;
encrypt the current representation of user interface data associated with the user using a process dependent on the current key value; and
provide data representing the encrypted current representation, the user, and the user interface to a client device associated with the user.

16. The multi-tenant data processing system of claim 15, wherein the business related data processing applications installed in the system include one or more of an enterprise resource planning (ERP), customer relationship management (CRM) or eCommerce application.

17. The multi-tenant data processing system of claim 15, wherein when executed by the processor the instructions cause the system to determine a set of user interface elements to present to the user at a later time based at least in part on the user's usage data for one or more elements of the user interface.

18. The multi-tenant data processing system of claim 17, wherein determining a set of user interface elements to present to the user at a later time comprises applying one or more of a statistical analysis, ranking based on frequency of use, ranking based on number of uses, or a machine learning technique to the usage data.

19. The multi-tenant data processing system of claim 18, wherein applying one or more of a statistical analysis, ranking based on frequency of use, ranking based on number of uses, or a machine learning technique to the usage data further comprises applying the analysis, ranking, or technique to a plurality of sets of usage data for that user.

20. The multi-tenant data processing system of claim 15, wherein the current key value is a decimal number and encrypting the current representation of user interface data associated with the user using a process dependent on the current key value further comprises performing a circular shift of a binary number corresponding to the current representation by an amount dependent on a digit of the decimal number.

21. The multi-tenant data processing system of claim 15, wherein the one or more elements of the user interface include one or more of a set of data fields into which data may be entered by the user and a set of elements that may be selected or activated by the user.

* * * * *